United States Patent
Nagatani et al.

(10) Patent No.: US 11,654,930 B2
(45) Date of Patent: May 23, 2023

(54) DISPLAY CONTROL DEVICE, DISPLAY CONTROL METHOD, AND DISPLAY CONTROL PROGRAM

(71) Applicant: TOYOTA JIDOSHA KABUSHIKI KAISHA, Toyota (JP)

(72) Inventors: Takaaki Nagatani, Okazaki (JP); Shuhei Manabe, Toyota (JP); Masato Endo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/673,133

(22) Filed: Feb. 16, 2022

(65) Prior Publication Data

US 2022/0315030 A1 Oct. 6, 2022

(30) Foreign Application Priority Data

Mar. 31, 2021 (JP) .............................. JP2021-061385

(51) Int. Cl.
*B60W 50/14* (2020.01)
*B60W 40/08* (2012.01)
*B60K 35/00* (2006.01)

(52) U.S. Cl.
CPC ............. *B60W 50/14* (2013.01); *B60K 35/00* (2013.01); *B60W 40/08* (2013.01); *B60K 2370/188* (2019.05); *B60K 2370/1868* (2019.05); *B60K 2370/194* (2019.05); *B60K 2370/52* (2019.05); *B60W 2050/146* (2013.01); *B60W 2540/229* (2020.02); *B60W 2556/10* (2020.02)

(58) Field of Classification Search
CPC .. B60W 50/14; B60W 40/08; B60W 2556/10; B60W 2540/229; B60W 2050/146; B60K 35/00; B60K 2370/194; B60K 2370/188; B60K 2370/52; B60K 2370/1868
USPC ......................................................... 340/439
See application file for complete search history.

(56) References Cited

U.S. PATENT DOCUMENTS 7,474,862 B2 * 1/2009 Shouno ................. G06F 21/608
399/80
10,282,731 B2 * 5/2019 Masuko ............. G06Q 30/0643
(Continued)

FOREIGN PATENT DOCUMENTS

JP 2014-071621 A 4/2014

*Primary Examiner* — Zhen Y Wu
(74) *Attorney, Agent, or Firm* — Dinsmore & Shohl LLP

(57) ABSTRACT

A display control device includes an acquisition unit configured to acquire a browsing history including a record indicating that vehicle driving information corresponding to each of a plurality of display elements was displayed on the display unit of each of the driver of a vehicle and a manager who manages the driver, an identification unit configured to identify a specific element from among the display elements based on the difference between the number of browses by the driver and the number of browses by the manager that are recorded in the browsing history acquired by the acquisition unit, and a display control unit configured to cause the display unit of at least one of the driver and the manager to display the specific element with the display form of the specific element, identified by the identification unit, made different from the display form of the other display elements.

10 Claims, 7 Drawing Sheets

(56) References Cited

U.S. PATENT DOCUMENTS

| | | | |
|---|---|---|---|
| 2013/0060843 A1* | 3/2013 | Yamahara | G06Q 30/02 |
| | | | 709/203 |
| 2013/0260344 A1* | 10/2013 | Musicant | G09B 19/167 |
| | | | 434/65 |
| 2013/0290865 A1* | 10/2013 | Kageyama | G06F 3/048 |
| | | | 715/747 |
| 2014/0047387 A1* | 2/2014 | Iwabuchi | G06Q 30/0253 |
| | | | 715/810 |
| 2014/0162219 A1* | 6/2014 | Stankoulov | G09B 19/167 |
| | | | 434/65 |
| 2014/0189519 A1* | 7/2014 | Powell | H04L 67/535 |
| | | | 715/736 |
| 2015/0205879 A1* | 7/2015 | Karasudani | G06F 16/957 |
| | | | 707/737 |
| 2020/0151790 A1* | 5/2020 | Oh | G06Q 20/4014 |
| 2021/0097492 A1* | 4/2021 | Tam | G06F 16/22 |

\* cited by examiner

FIG. 9

| STEERING OPERATION | ACCELERATOR OPERATION | BRAKE OPERATION | ECO-FRIENDLINESS DEGREE |
|---|---|---|---|

DRIVER A : 60 POINTS   REDUCE SUDDEN STEERING OPERATION

DRIVER B : 70 POINTS   REDUCE SUDDEN STEERING OPERATION

DRIVER C : 65 POINTS   REDUCE SUDDEN STEERING OPERATION

FIG. 10

| STEERING OPERATION | ACCELERATOR OPERATION | BRAKE OPERATION | ECO-FRIENDLINESS DEGREE |
|---|---|---|---|

DRIVER IS NOT PAY ATTENTION TO 'ECO-FRIENDLINESS DEGREE'

DRIVER A : 60 POINTS   REDUCE SUDDEN STEERING OPERATION

DRIVER B : 70 POINTS   REDUCE SUDDEN STEERING OPERATION

DRIVER C : 65 POINTS   REDUCE SUDDEN STEERING OPERATION

DISPLAY CONTROL DEVICE, DISPLAY CONTROL METHOD, AND DISPLAY CONTROL PROGRAM

CROSS-REFERENCE TO RELATED APPLICATION

This application claims priority to Japanese Patent Application No. 2021-061385 filed on Mar. 31, 2021, incorporated herein by reference in its entirety.

BACKGROUND

1. Technical Field

The present disclosure relates to a display control device, a display control method, and a display control program.

2. Description of Related Art

Japanese Unexamined Patent Application Publication No. 2014-71621 (JP 2014-71621 A) discloses a technique that can reduce a burden on a manager when the driving operation of drivers is managed in real time.

SUMMARY

The technique disclosed in JP 2014-71621 A is used, for example, in the operation office of a transportation company, a bus transportation bureau, and so on when a manager gives guidance on safety driving or energy saving to drivers who are not competent for driving operations.

In addition to the method described above, there are some other methods used by a manager to guide a driver in safety driving and energy saving driving. One of the possible methods is that a website and an application, browsable by both the driver and the manager, are used to make guidance contents available to the driver so that the driver can browse the guidance contents.

However, when the above-described website and application are composed of a plurality of pages, there is a page that is browsed frequently by the manager but less frequently by the driver than the manager expected; conversely, there is a page that is browsed by the driver more frequently than the manager expected but less frequently by the manager. For example, a page describing guidance contents for the driver is a page that the manager wants the driver to browse but, in some cases, the page is browsed frequently by the manager but less frequently by the driver. Therefore, there is room for improvement in making the driver browse a page that the manager wants to emphasize.

In view of the foregoing, the present disclosure provides a display control device, a display control method, and a display control program that encourage a driver to browse the information that the manager wants to emphasize.

A first aspect of the present disclosure relates to a display control device including an acquisition unit, an identification unit, and a display control unit. The acquisition unit is configured to acquire a browsing history. The browsing history includes a record indicating that vehicle driving information corresponding to each of a plurality of display elements was displayed on the display unit of each of the driver of a vehicle and a manager who manages the driver. The identification unit is configured to identify a specific element from among the display elements based on the difference between the number of browses by the driver and the number of browses by the manager. The number of browses is included in the browsing history acquired by the acquisition unit. The display control unit is configured to cause the display unit of at least one of the driver and the manager to display the specific element with the display form of the specific element made different from the display form of other display elements. The specific element is identified by the identification unit.

In the display control device according to the first aspect described above, the acquisition unit acquires the browsing history that includes a record indicating that the information corresponding to each display element was displayed on the display unit of each of the driver and the manager. In addition, the identification unit identifies a specific element based on the difference between the number of browses by the driver and the number of browses by the manager. The number of browses is recorded in the browsing history acquired by the acquisition unit. After that, the display control unit causes the display unit of at least one of the driver and the manager to display the identified specific element with the display form of the specific element made different from the display form of the other display elements. As a result, the display control device displays the display elements with the display form of the specific element made different from the display form of the other display elements in this way, making it possible to encourage the driver to browse the information that the manager wants to emphasize.

In the display control device according to the first aspect, the display control unit may be configured to cause the display unit to display the specific element with the display position of the specific element changed on the display unit of at least one of the driver and the manager.

In the display control device described above, the display control unit may cause the display unit to display the specific element with its display position changed on the display unit of at least one of the driver and the manager. As a result, the display control device displays the specific element with its display position changed in this way, making it possible to encourage at least one of the driver and the manager to pay attention to the specific element.

In the display control device according to the first aspect, the display control unit may be configured to cause the display unit to display the specific element with a decoration applied to the specific element on the display unit of at least one of the driver and the manager. The decoration is different from the decoration of the other display elements.

In the display control device described above, the display control unit may cause the display unit to display the specific element with a decoration, different from that of the other display elements, applied to the specific element on the display unit of at least one of the driver and the manager. As a result, the display control device displays the specific element with a decoration, different from that of the other specific elements, applied to the specific element in this way, making it possible to encourage at least one of the driver and the manager to pay attention to the specific element.

In the display control device according to the first aspect, the display control unit may be configured to cause the display unit of the driver to display information indicating that the manager is paying attention to the specific element.

In the display control device described above, the display control unit may cause the display unit of the driver to display the information indicating that the manager is paying attention to the specific element. As a result, the display control device makes it possible for the driver viewing the display unit of the driver to recognize that the manager is paying attention to the specific element.

In the display control device according to the first aspect, the display control unit may be configured to cause the display unit of the manager to display information indicating that the driver is not paying attention to the specific element.

In the display control device described above, the display control unit may cause the display unit of the manager to display the information indicating that the driver is not paying attention to the specific element. As a result, the display control device makes it possible for the manager viewing the display unit of the manager to recognize that the driver is not paying attention to the specific element.

In the display control device according to the first aspect, the display control unit may be configured to cause the display unit of the driver to display the specific element with the display form of the specific element made different according to the attribute of the driver.

In the display control device described above, the display control unit may cause the display unit of the driver to display the specific element with the display form of the specific element made different according to the attribute of the driver. As a result, the display control device makes it possible to adjust the driver's attention to the specific element in this way according to the attribute of the driver.

In the display control device according to the first aspect, when a plurality of the specific elements is identified, the identification unit may be configured to identify the specific elements by dividing the specific elements at least into first specific elements and second specific elements. The difference between the number of browses by the driver and the number of browses by the manager of each of the second specific elements is larger than the difference between the number of browses by the driver and the number of browses by the manager of each of the first specific elements. The display control unit may be configured to cause the display unit to display the first specific elements and the second specific elements with the display form of the first specific elements and the second specific elements made different from the display form of the other display elements and made different between the first specific elements and the second specific elements. The first specific elements and the second specific elements are those identified by the identification unit.

In the display control device described above, when a plurality of specific elements is identified, the identification unit may identify the specific elements by dividing the specific elements at least into first specific elements and second specific elements. In addition, the display control unit may cause the display unit to display the first specific elements and the second specific elements, both of which have been identified by the identification unit, with the display form of the first specific elements and the second specific elements made different from the display form of the other display elements and made different between the first specific elements and the second specific elements. As a result, when there is a plurality of specific elements, the display control device makes it possible to attract more attention to each of the specific elements.

In the display control device according to the first aspect, when a plurality of the specific elements is identified, the identification unit may be configured to identify the specific elements by dividing the specific elements at least into first specific elements and second specific elements. The difference between the number of browses by the driver and the number of browses by the manager of each of the second specific elements is larger than the difference between the number of browses by the driver and the number of browses by the manager of each of the first specific elements. The display control unit may be configured to cause the display unit to display the second specific elements with the display form of the second specific elements made different from the display form of the other display elements and to display the first specific elements with the display form of the first specific elements made similar to the display form of the other display elements. The first specific elements and the second specific elements are those identified by the identification unit.

In the display control device described above, when identifying a plurality of specific elements, the identification unit may identify the specific elements by dividing them at least into first specific elements and second specific elements. The display control unit may cause the display unit to display the second specific elements, identified by the identification unit, with the display form of the second specific elements made different from the display form of the other display elements and to display the first specific elements, identified by the identification unit, with the display form of the first specific elements made similar to the display form of the other display elements. As a result, when there is a plurality of specific elements, the display control device makes it possible to attract more attention to the specific element having the largest difference between the number of browses by the driver and the number of browses by the manager.

A second aspect of the present disclosure relates to a display control method including acquiring, identifying, and causing. The acquiring acquires a browsing history that includes a record indicating that vehicle driving information corresponding to each of a plurality of display elements was displayed on the display unit of each of the driver of a vehicle and the manager who manages the driver. The identifying identifies a specific element from among the display elements based on the difference between the number of browses by the driver and the number of browses by the manager included in the acquired browsing history. The causing causes the display unit of at least one of the driver and the manager to display the identified specific element with the display form of the specific element made different from the display form of other display elements.

A third aspect of the present disclosure relates to a display control program causing a computer to perform processing to acquire, to identify, and to cause. The processing to acquire acquires a browsing history that includes a record indicating that vehicle driving information corresponding to each of a plurality of display elements was displayed on the display unit of each of the driver of a vehicle and the manager who manages the driver. The processing to identify identifies a specific element from among the display elements based on a difference between the number of browses by the driver and the number of browses by the manager included in the acquired browsing history. The processing to cause causes the display unit of at least one of the driver and the manager to display the identified specific element with a display form of the specific element made different from a display form of other display elements.

As described above, the display control device, the display control method, and the display control program according to the present disclosure can encourage the driver to browse the information that the manager wants to emphasize.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a diagram showing a first display example of the web application displayed on a display unit of a display control device according to the embodiment; and FIG. 10 is a diagram showing a second display example of the web application displayed on the display unit of the display control device according to the embodiment.

DETAILED DESCRIPTION OF EMBODIMENTS

First Embodiment

A display control system 10 according to an embodiment will be described below. The display control system 10 according to this embodiment is a system that controls the display of a web application that can be browsed by both the drivers of a vehicle transportation business operator, such as a taxi company and a transportation company, and a manager who manages the drivers.

Figure 1:
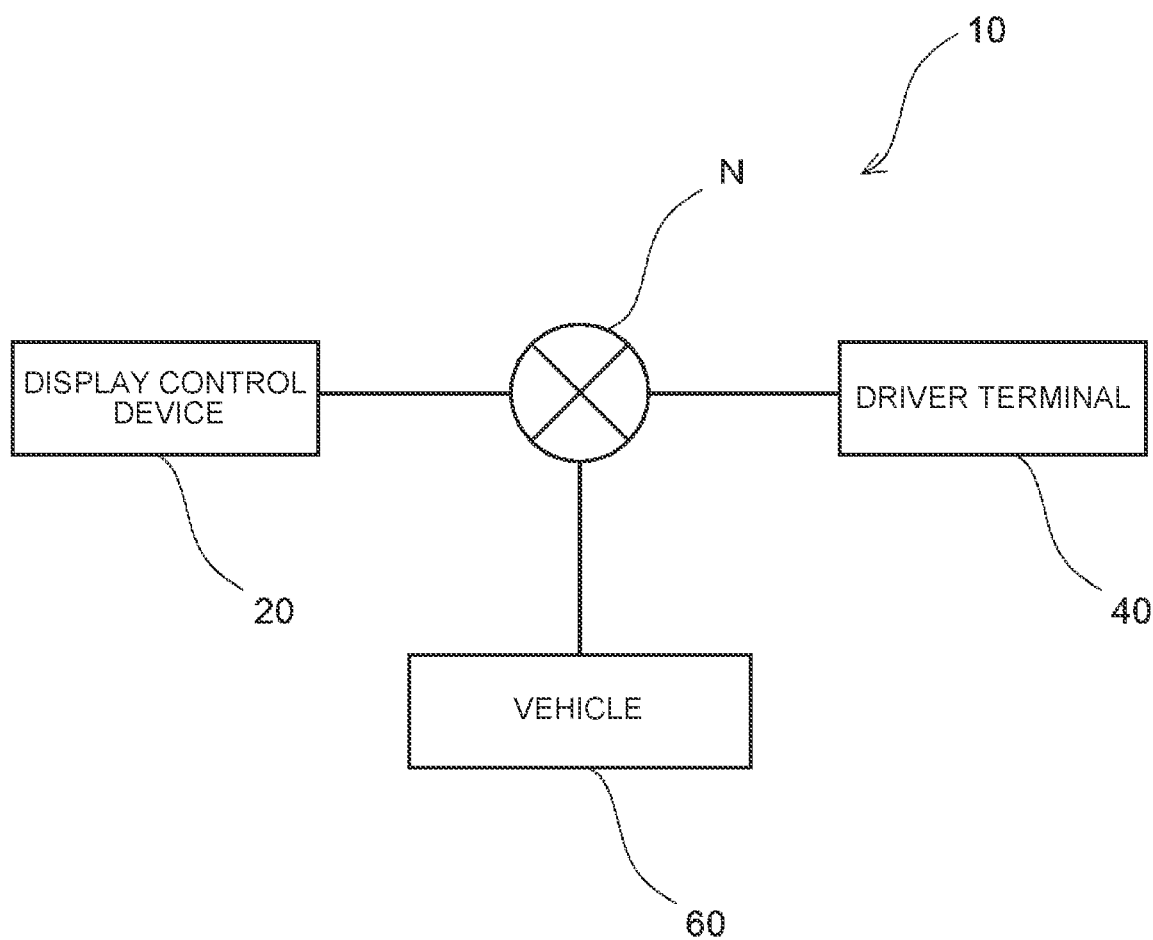
FIG. 1 is a diagram showing a schematic configuration of a display control system according to an embodiment.

FIG. 1 is a diagram showing a schematic configuration of the display control system 10. As shown in FIG. 1, the display control system 10 includes a display control device 20, a driver terminal 40, and a vehicle 60. The display control device 20, driver terminal 40, and vehicle 60 are connected via a network N for communication with each other. The vehicle 60 connected to the network N is, for example, a vehicle carrying a user.

The display control device 20 is a server computer owned by the operator that manages the vehicle 60. The driver terminal 40 is a mobile terminal owned by the driver of the vehicle 60. For example, a portable personal computer (notebook PC), a smartphone, a tablet terminal, or the like is used as the driver terminal 40. In this embodiment, a smartphone is used as the driver terminal 40.

The vehicle 60 may be a gasoline vehicle, a hybrid vehicle, or an electric vehicle. In this embodiment, a gasoline vehicle is used as an example of the vehicle 60.

Figure 2:
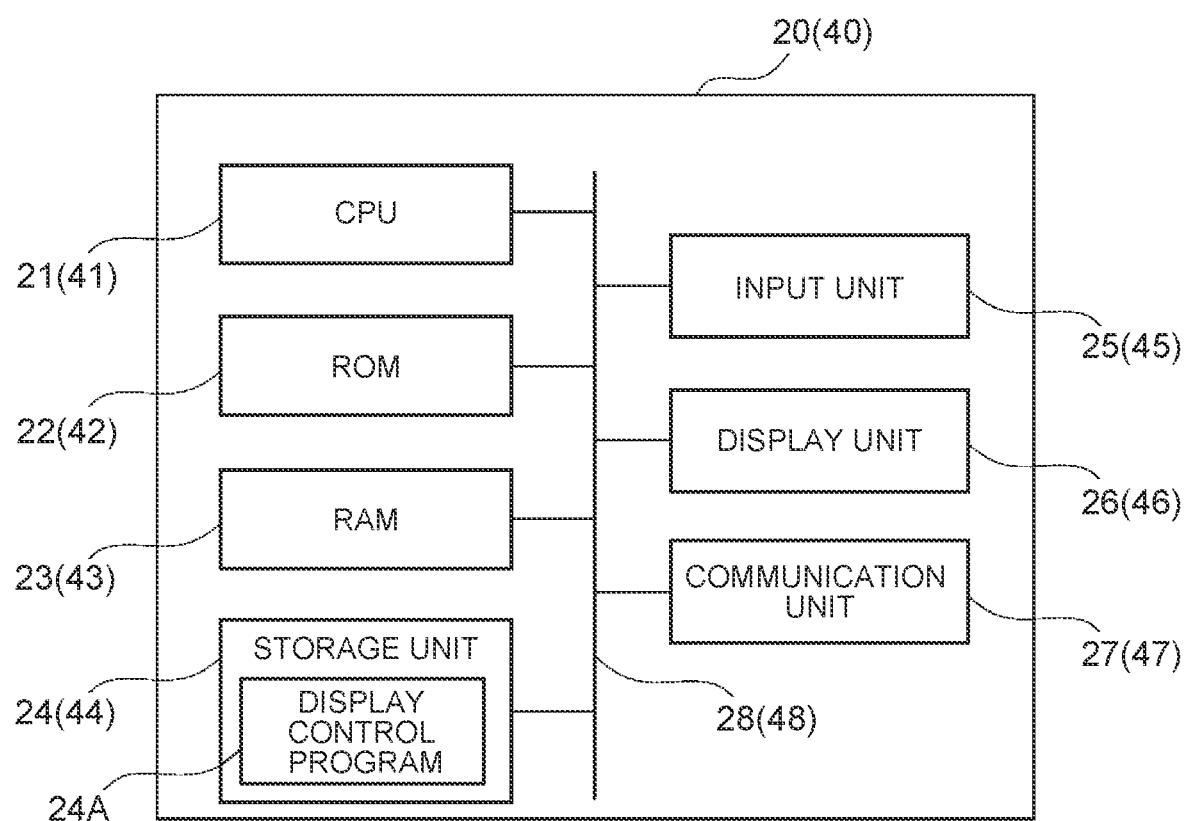
FIG. 2 is a block diagram showing a hardware configuration of a display control device according to the embodiment.

Next, a hardware configuration of the display control device 20 and the driver terminal 40 will be described. FIG. 2 is a block diagram showing a hardware configuration of the display control device 20 and the driver terminal 40. The display control device 20 and the driver terminal 40 basically have a general computer configuration and, therefore, only the configuration of the display control device 20 will be described below.

As shown in FIG. 2, the display control device 20 includes a central processing unit (CPU) 21, a read only memory (ROM) 22, a random access memory (RAM) 23, a storage unit 24, an input unit 25, a display unit 26, and a communication unit 27. These components are connected to each other for communication via a bus 28.

The CPU 21, a central arithmetic processing unit, executes various programs and controls the components. That is, the CPU 21 reads a program from the ROM 22 or the storage unit 24 for program execution using the RAM 23 as the work area. The CPU 21 controls the components described above, and performs various types of arithmetic processing, according to a program recorded in the ROM 22 or the storage unit 24.

The ROM 22 stores various programs and various types of data. The RAM 23, which is used as a work area, temporarily stores a program or data.

The storage unit 24, which is composed of a storage device such as a hard disk drive (HDD), a solid state drive (SSD), or a flash memory, stores various programs and various types of data. In this embodiment, the storage unit 24 stores at least a display control program 24A to perform the change processing that will be described later.

In addition, the storage unit 24 stores the browsing log of the web application that can be browsed by both the driver and the manager. In this embodiment, the log data on each page of the web application browsed by the driver and the manager is stored in the storage unit 24 as the browsing log. A page is an example of "vehicle driving information." In this embodiment, a plurality of pages is provided as the pages, each of which displays an evaluation value related to any one of the driver's steering operation, accelerator operation, brake operation, and fuel-efficient operation. The contents displayed in the pages of the steering operation, accelerator operation, brake operation, and fuel-efficient driving page are generated based on the steering angle of the steering wheel, acceleration, speed, and driving fuel cost, respectively, acquired by the ECU 70 of the vehicle 60 that will be described later.

The input unit 25, which includes a pointing device such as a mouse, a keyboard, a microphone, and a camera, is used for receiving various types of input.

The display unit 26, such as a liquid crystal display, displays various types of information. The display unit 26 may function as the input unit 25 by using the touch panel method. The display unit 26 is an example of "a display unit of the manager."

The communication unit 27 is an interface for communication with other devices. For the communication, the wired communication standard such as Ethernet (registered trademark) or FDDI, or the wireless communication standard such as the 4G communication standard, 5G communication standard, or Wi-Fi (registered trademark) communication standard is used. When executing the display control program 24A described above, the display control device 20 uses the hardware resources described above to perform processing based on the display control program 24A.

Figure 3:
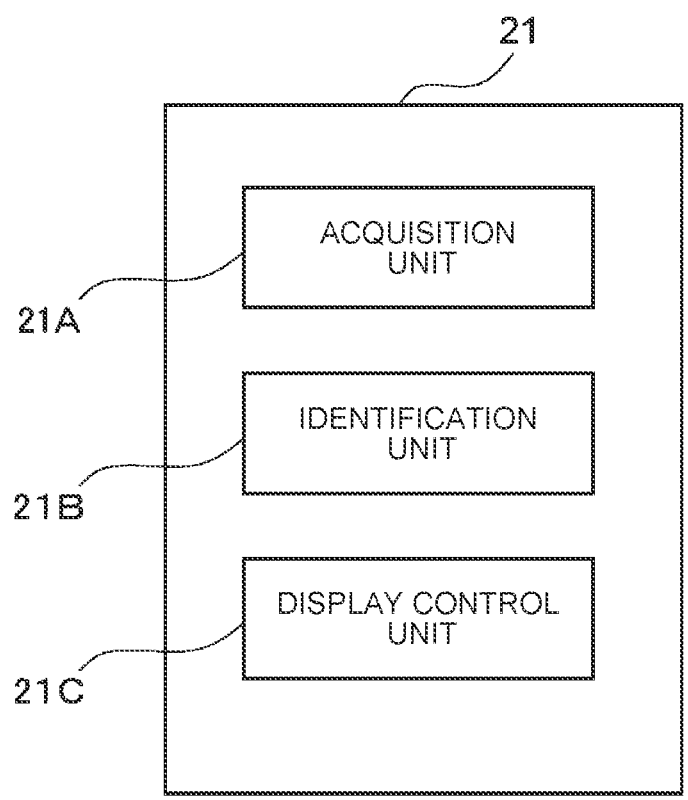
FIG. 3 is a block diagram showing an example of a functional configuration of the display control device according to the embodiment.

Next, a functional configuration of the display control device 20 will be described. FIG. 3 is a block diagram showing an example of a functional configuration of the display control device 20 according to this embodiment.

As shown in FIG. 3, the CPU 21 of the display control device 20 includes an acquisition unit 21A, an identification unit 21B, and a display control unit 21C as the functional components. Each functional component is implemented when the CPU 21 executes the display control program 24A that is read from the storage unit 24.

The acquisition unit 21A acquires the browsing log that includes a record indicating that the page corresponding to each of a plurality of tabs of the web application was displayed on the display unit 26 and a display unit 46. The tab is an example of a "display element", the display unit 46 is an example of a "display unit of the driver", and the browsing log is an example of a "browsing history." In this embodiment, the acquisition unit 21A acquires the browsing log of the web application from the storage unit 24, for example, every 24 hours.

The identification unit 21B identifies a specific tab from among a plurality of tabs based on the difference between the number of browses by the driver and the number of browses by the manager that are recorded in the browsing log acquired by the acquisition unit 21A. The specific tab is an example of a "specific element." In this embodiment, the identification unit 21B identifies a tab as a "specific tab", for example, when the tab is a tab for displaying a page for which it is determined, based on the browsing log, that the number of browses by the manager is larger than the number of browses by the driver and for which the difference between the number of browses by the driver and the number of browses by the manager is equal to or larger than a predetermined threshold.

The display control unit 21C causes the display unit 26 and the display unit 46 to display a specific tab with the display form of the specific tab, identified by the identification unit 21B, made different from the display form of the other tabs. Actual examples of a specific tab displayed on the display unit 26 and the display unit 46 with the display form made different from the display form of the other tabs will be described later.

It should be noted here that a change in the "display form of a tab", such as the display form of a specific tab and the display form of the other tabs, includes not only changing the tab itself but also adding information on the tab of the page being displayed.

Figure 4:
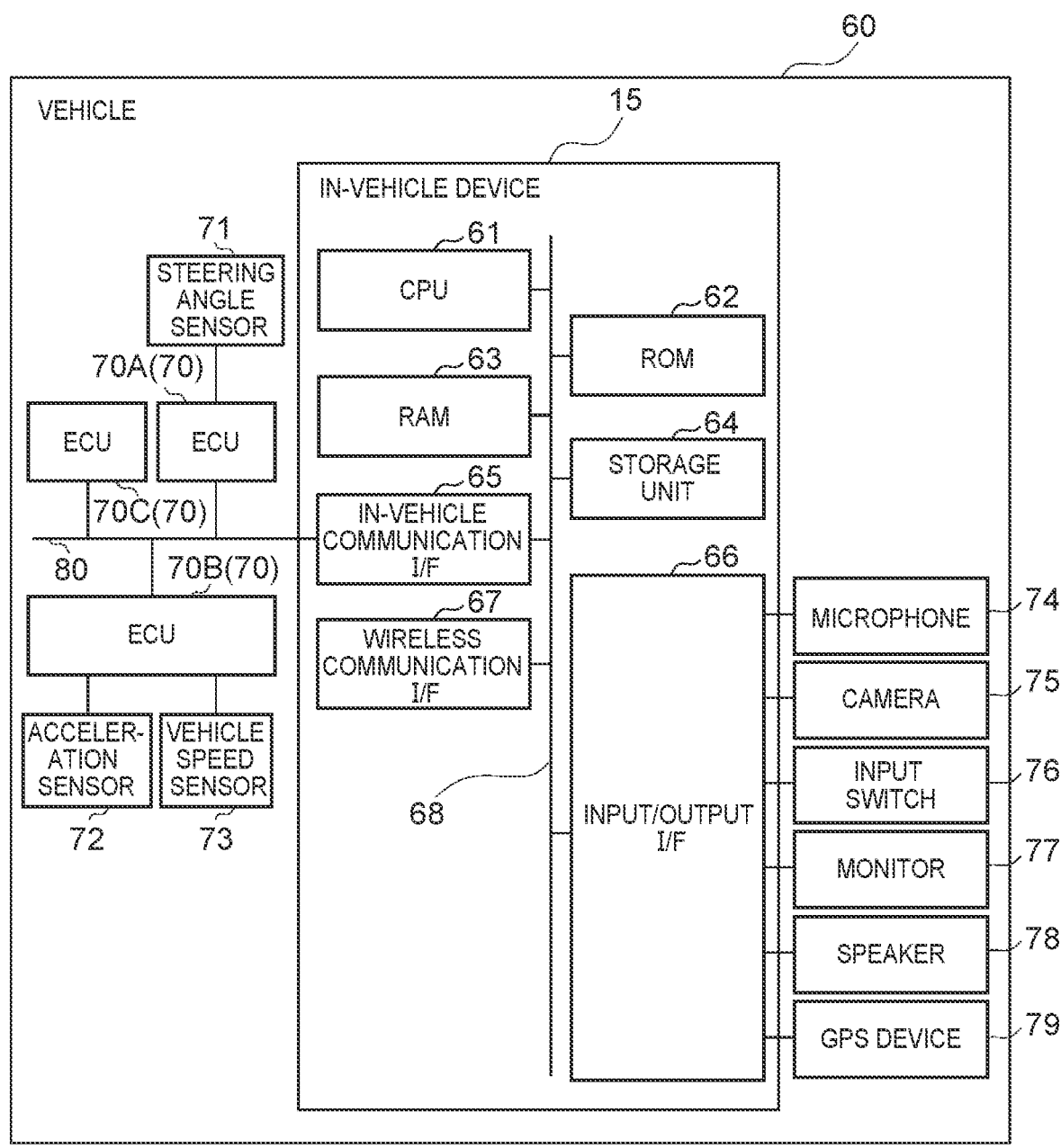
FIG. 4 is a block diagram showing a hardware configuration of a vehicle according to the embodiment.

Next, the hardware configuration of the vehicle 60 will be described. FIG. 4 is a block diagram showing the hardware configuration of the vehicle 60.

As shown in FIG. 4, the vehicle 60 includes an in-vehicle device 15, a plurality of electronic control units (ECU) 70, a steering angle sensor 71, an acceleration sensor 72, a vehicle speed sensor 73, a microphone 74, a camera 75, an input switch 76, a monitor 77, a speaker 78, and a GPS device 79.

The in-vehicle device 15 includes a CPU 61, a ROM 62, a RAM 63, a storage unit 64, an in-vehicle communication interface (I/F) 65, an input/output I/F 66, and a wireless communication I/F 67. The CPU 61, ROM 62, RAM 63, storage unit 64, in-vehicle communication I/F 65, input/output I/F 66, and wireless communication I/F 67 are connected to each other for communication with each other via the internal bus 68.

The CPU 61, a central processing unit, executes various programs and controls the components. That is, the CPU 61 reads a program from the ROM 62 or the storage unit 64 for program execution using the RAM 63 as a work area. The CPU 61 controls the components described above, and performs various types of arithmetic processing, according to a program recorded in the ROM 62 or the storage unit 64.

The ROM 62 stores various programs and various types of data. The RAM 63 is used as a work area for temporarily storing a program or data.

The storage unit 64, which is composed of a storage device such as an HDD, an SSD, or a flash memory, stores various programs and various types of data.

The in-vehicle communication I/F 65 is an interface for connection to the ECU 70. For this interface, a communication standard based on the CAN protocol is used. The in-vehicle communication I/F 65 is connected to the external bus 80.

A plurality of ECUs 70 is provided, one for each function of the vehicle 40. In this embodiment, three ECUs are provided: ECU 70A, ECU 70B, and ECU 70C. The ECU 70A is, for example, an electric power steering ECU. To the ECU 70A, the steering angle sensor 71 is connected. The ECU 70B is, for example, an ECU for vehicle stability control (VSC). To the ECU 70B, the acceleration sensor 72 and the vehicle speed sensor 73 are connected. To the ECU 70B, not only the acceleration sensor 72 and the vehicle speed sensor 73 but also a yaw rate sensor may be connected. The ECU 70C is, for example, an engine ECU. The ECU 70C calculates the driving fuel cost based on the fuel flow rate obtained from the sensors (not shown).

The steering angle sensor 71 is a sensor for detecting the steering angle of the steering wheel. The steering angle detected by the steering angle sensor 71 is stored in the storage unit 64 and, at the same time, sent to the display control device 20.

The acceleration sensor 72 is a sensor for detecting the acceleration applied to the vehicle 60. The acceleration sensor 72 is, for example, a three-axis acceleration sensor that detects acceleration applied in the vehicle front-rear direction (X-axis direction), the vehicle width direction (Y-axis direction), and the vehicle height direction (Z-axis direction). The acceleration detected by the acceleration sensor 72 is stored in the storage unit 64 and, at the same time, sent to the display control device 20.

The vehicle speed sensor 73 is a sensor for detecting the speed of the vehicle 60. The vehicle speed sensor 73 is, for example, a sensor provided on a wheel. The speed detected by the vehicle speed sensor 73 is stored in the storage unit 64 and, at the same time, sent to the display control device 20.

The input/output I/F 66 is an interface for communicating with the microphone 74, camera 75, input switch 76, monitor 77, speaker 78, and GPS device 79 mounted on the vehicle 60.

The microphone 74 is a device, provided on the front pillar or the dashboard of the vehicle 60, for collecting voices of the driver of the vehicle 60. The microphone 74 may also be provided in the camera 75 that will be described later.

The camera 75 is configured to include, for example, a charge coupled device (CCD) image sensor. The camera 75 is installed in the front side of the vehicle 60 for capturing the area in front of the vehicle. The image captured by the camera 75 is used, for example, for recognizing the inter-vehicle distance to the preceding vehicle traveling ahead of the vehicle, the lane, the traffic light, and the like. The image captured by the camera 75 is stored in the storage unit 64 and, at the same time, sent to the display control device 20. The camera 75 may be configured as a capturing device for other purposes such as a drive recorder. The camera 75 may be connected to the in-vehicle device 15 via an ECU 70 (for example, camera ECU).

The input switch 76 is a switch, provided on the instrument panel, center console, steering wheel, or the like, for accepting an operation by the driver's fingers. The input switch 76 is, for example, a pushbutton ten-key keypad, a touch pad, or the like.

The monitor 77 is a liquid crystal monitor, provided on an instrument panel, a meter panel, or the like, for displaying an operation proposal related to the function of the vehicle 60 and an image related to the explanation of the function. The monitor 77 may be provided as a touch panel that also serves as the input switch 76.

The speaker 78 is a device, provided on the instrument panel, center console, front pillar, dashboard, or the like, for outputting an operation proposal related to the function of the vehicle 60 and a voice related to the explanation of the function. The speaker 78 may also be provided on the monitor 77.

The GPS device 79 is a device that measures the current position of the vehicle 60. The GPS device 79 includes an antenna (not shown) that receives signals from GPS satellites. The GPS device 79 may be connected to the in-vehicle device 15 via a car navigation system connected to the ECU 70 (for example, multimedia ECU).

The wireless communication I/F 67 is a wireless communication module for communicating with the display control device 20. For the wireless communication module, the communication standard such as the 5G communication standard, LTE communication standard, or Wi-Fi (registered trademark) communication standard is used. The wireless communication I/F 67 is connected to the network N.

Figure 5:
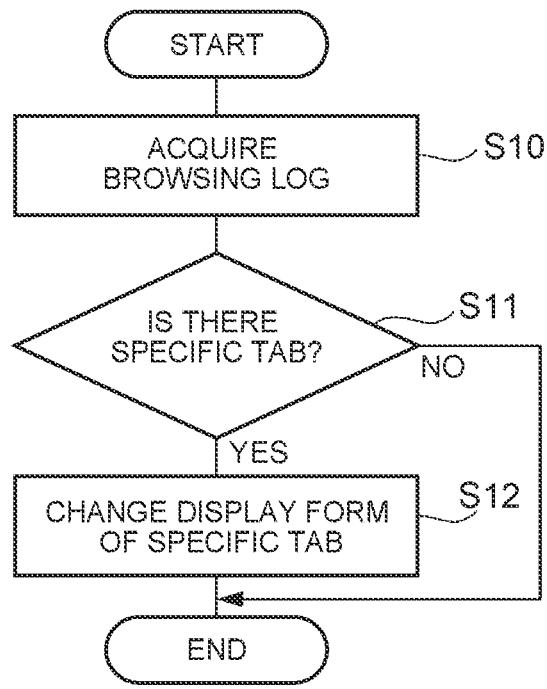
FIG. 5 is a flowchart showing the flow of change processing performed by the display control device according to the embodiment.

FIG. 5 is a flowchart showing the flow of the change processing performed by the display control device 20 for changing the display form of the web application composed of a plurality of pages. The CPU 21 reads the display control program 24A from the storage unit 24 and expands it into the RAM 23 for execution to perform the change processing.

In step S10 shown in FIG. 5, from the storage unit 24, the CPU 21 acquires log data on each page of the web application as the browsing log of the web application. In this case, the CPU 21 acquires two pieces of log data, one for the driver and the other for the manager. Then, the processing proceeds to step S11.

In step S11, the CPU 21 determines whether there is a specific tab, based on the difference between the number of browses by the driver and the number of browses by the manager that are recorded in the browsing log acquired in step S10. When it is determined that there is a specific tab (step S11: YES), the processing proceeds to step S12. On the other hand, when it is determined by the CPU 21 that there is no specific tab (step S11: NO), the processing is terminated. For example, the CPU 21 determines that there is a specific tab when there is a tab for displaying a page for which it is determined, based on the browsing log, that the number of browses by the manager is larger than the number of browses by the driver and for which the difference between the number of browses by the driver and the number of browses by the manager is equal to or larger than the predetermined threshold value.

In step S12, the CPU 21 changes the display form of the specific tab, identified in step S11, and causes the display unit to display it. Then, the processing is terminated.

Next, display examples of the web application displayed on the display unit 26 of the display control device 20 or the display unit 46 of the driver terminal 40 will be described.

Figure 6:
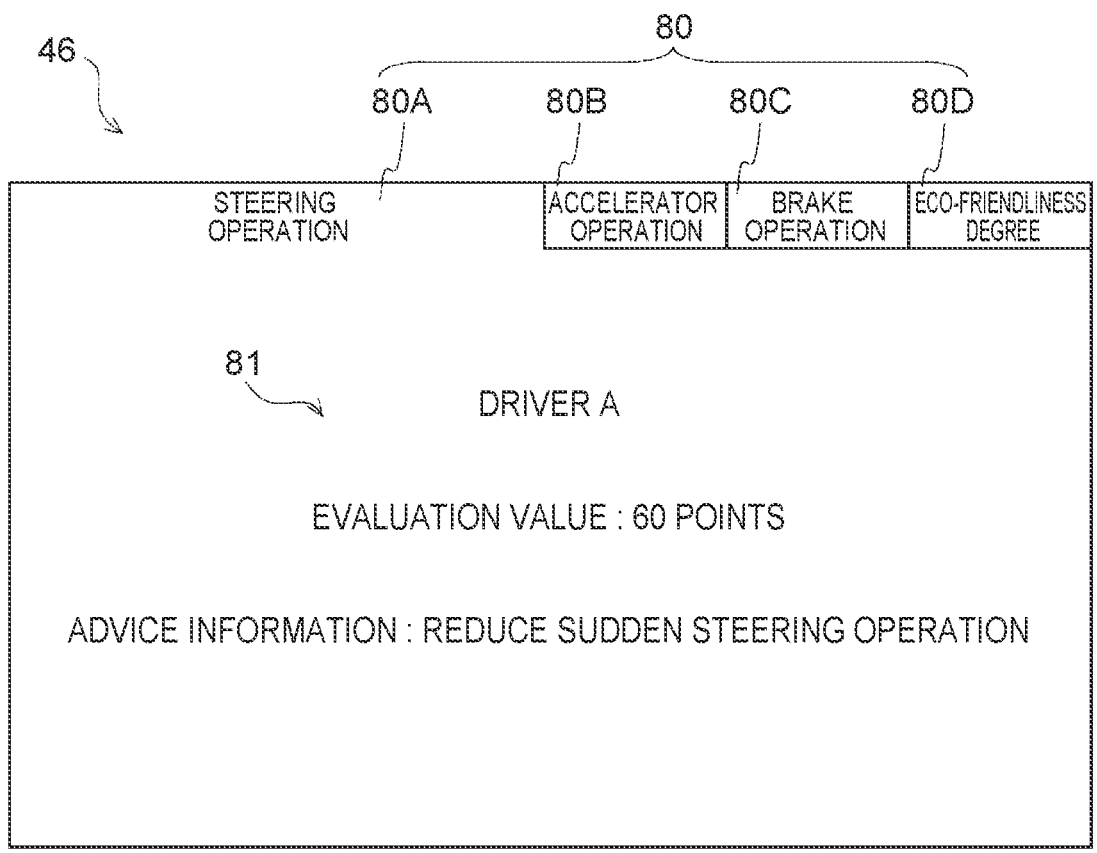
FIG. 6 is a diagram showing a first display example of a web application displayed on a display unit of a driver terminal according to the embodiment.

FIG. 6 is a first display example of the web application displayed on the display unit 46 of the driver terminal 40. When the web application is executed in the driver terminal 40 and a predetermined operation on the web application is performed, the CPU 21 of the display control device 20 causes the display unit 46 of the driver terminal 40 to display the display example shown in FIG. 6. In the description below, display examples of the web application displayed on the display unit 46 of the driver terminal 40, owned by driver A who is the driver of the vehicle 60, will be described as an example.

In the display example shown in FIG. 6, a page switching part 80 and a page display part 81 are displayed.

The page switching part 80 includes a plurality of switching tabs each of which switches the page of the web application to be displayed in the page display part 81. More specifically, the page switching part 80 includes four parts: a first switching part 80A that switches the web application page to the steering operation page, a second switching part 80B that switches the web application page to the accelerator operation page, a third switching part 80C that switches the web application page to the brake operation page, and a fourth switching part 80D that switches the web application page to the eco-friendliness degree page. In the web application in this embodiment, the contents of the page corresponding to the first switching part 80A are displayed when the web application is started. Therefore, the more a switching tab is positioned on the left side in the page switching part 80, the easier it is for the driver or the manager to view the tab indicated by the page switching part 80. That is, in the page switching part 80 shown in FIG. 6, the first switching part 80A positioned at the left end is easiest to view, and the fourth switching part 80D positioned at the right end is most difficult to view.

The steering operation page is, for example, a page in which the evaluation value related to the steering operation of the driver and the advice information contributing to an improvement in the evaluation value are displayed.

The accelerator operation page is, for example, a page in which the evaluation value related to the accelerator operation of the driver and the advice information contributing to an improvement in the evaluation value are displayed.

The brake operation page is, for example, a page in which the evaluation value related to the brake operation of the driver and the advice information contributing to an improvement in the evaluation value are displayed.

The eco-friendliness degree page is, for example, a page in which the evaluation value related to the fuel-efficient driving of the driver and the advice information contributing to an improvement in the evaluation value are displayed.

In this embodiment, the page corresponding to the page switching tab having the largest tab size is displayed in the page display part 81. That is, in the display example shown in FIG. 6, the steering operation page corresponding to the first switching part 80A is displayed in the page display part 81.

After that, when an operation for a page switching tab having a tab size that is not largest is accepted in this embodiment, the CPU 21 switches the page, which is to be displayed in the page display part 81, to the page corresponding to the page switching tab.

The page display part 81 is a part in which the contents of the page selected from the page switching part 80 are displayed. In the page display part 81 shown in FIG. 6, the steering operation page corresponding to the first switching part 80A is displayed. In the steering operation page, it is indicated that the evaluation value of the steering operation of driver A is "60 points" and that the advice information contributing to an improvement in the evaluation value is "Let's reduce sudden steering operation."

Figure 7:
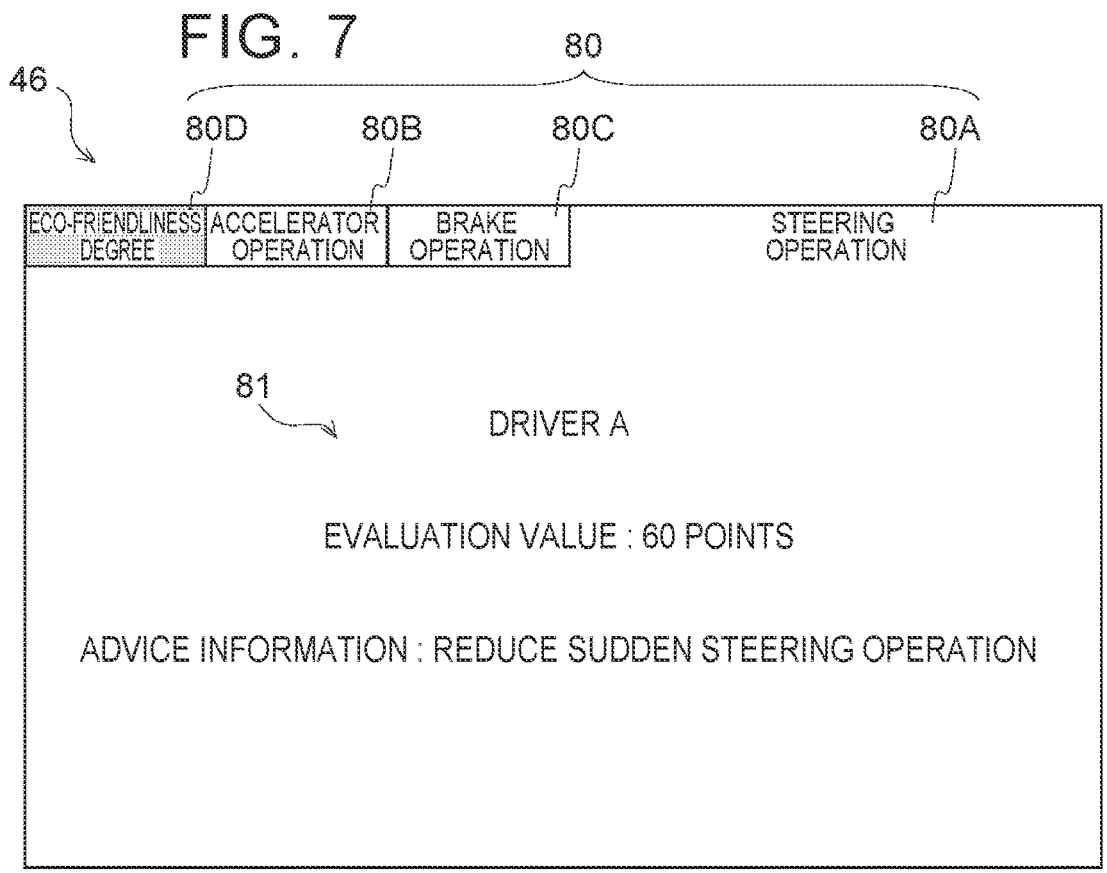
FIG. 7 is diagram showing a second display example of the web application displayed on the display unit of the driver terminal according to the embodiment.

FIG. 7 is a diagram showing a second display example of the web application displayed on the display unit 46 of the driver terminal 40. The display example shown in FIG. 7 indicates the state in which the display form of the specific tab has been changed from the display form in the display example shown in FIG. 6.

For example, in step S11 shown in FIG. 5, the CPU 21 determines that there is a page for which it is determined, based on the browsing log, that the number of browses by the manager is larger than the number of browses by the driver and for which the difference between the number of browses by the driver and the number of browses by the manager is equal to or larger than the predetermined threshold value. The CPU 21 identifies that the page is the eco-friendliness degree page. Then, in step S11, the CPU 21 identifies the fourth switching part 80D, which is the tab for displaying the eco-friendliness degree page, as the specific tab. After that, in step S12, the CPU 21 changes the display form of the fourth switching part 80D from the display example shown in FIG. 6 to the display example shown in FIG. 7.

The page switching part 80 shown in FIG. 7 includes, from left to right, in the order of the fourth switching part 80D, the second switching part 80B, the third switching part 80C, and the first switching part 80A. The page switching part 80 shown in FIG. 7 is different from the page switching part 80 shown in FIG. 6 in the arrangement order. In addition, the color of the tab of the fourth switching part 80D shown in FIG. 7 is different from the colors of the tabs of the first switching part 80A, the second switching part 80B, and the third switching part 80C.

In the above case, in step S12 in FIG. 5, the CPU 21 causes the display unit to display the fourth switching part 80D, which is the tab for displaying the eco-friendliness degree page, with its display position changed. In addition, in step S12, the CPU 21 causes the display unit to display the fourth switching part 80D, which is the tab for displaying the eco-friendliness degree page, with a decoration applied (more specifically, with a color applied). This decoration is different from that of the first switching part 80A, second switching part 80B, and third switching part 80C that are the tabs for displaying the other pages of the web application.

Note that the change made to the specific tab described above (more specifically, the change in the display form of the fourth switching part 80D) is applied not only to the web application displayed on the display unit 46 of the driver terminal 40 but also to the web application displayed on the display unit 26 of the display control device 20. That is, after applying the above changes, the display form of the page switching part 80 displayed on the display unit 26 of the display control device 20 has the same order and the same color as those of the page switching part 80 shown in FIG. 7.

Figure 8:
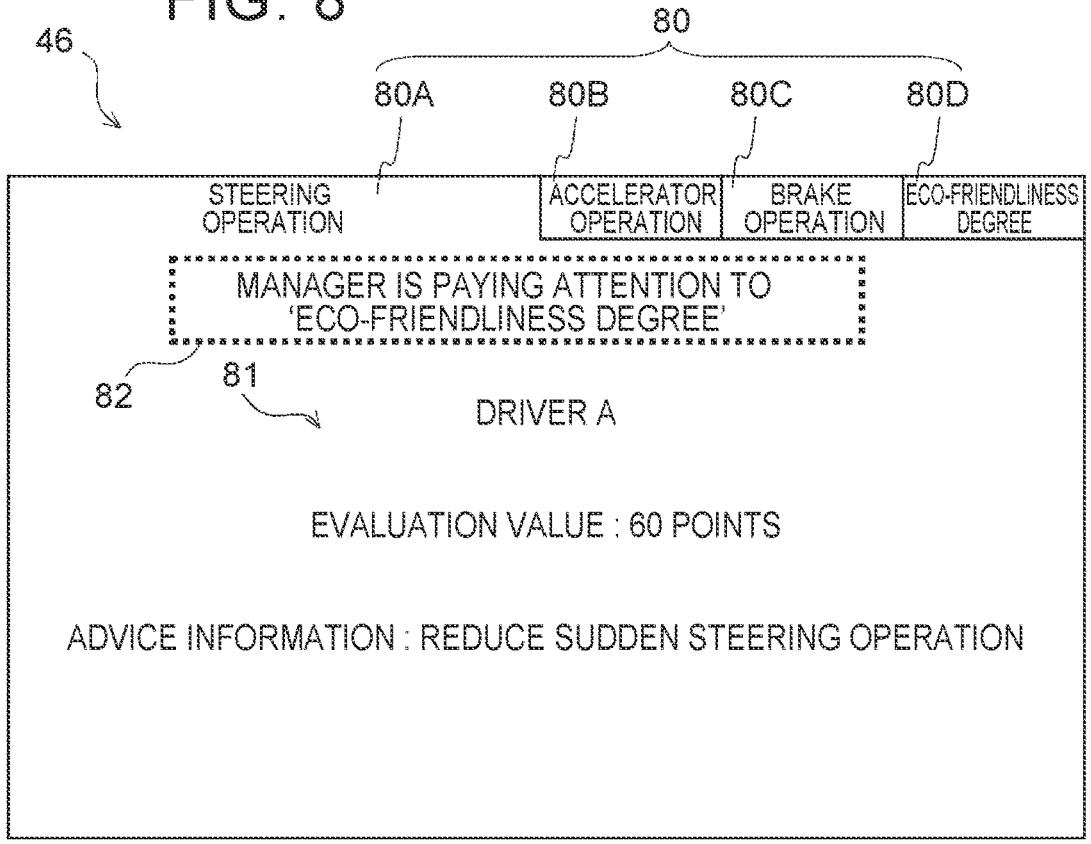
FIG. 8 is a diagram showing a third display example of the web application displayed on the display unit of the driver terminal according to the embodiment.

FIG. 8 is a diagram showing a third display example of the web application displayed on the display unit 46 of the driver terminal 40. The display example shown in FIG. 8 shows another example different from the example shown in FIG. 7 in which the display form of the specific tab has been changed from the display form shown in FIG. 6.

For example, in step S11 shown in FIG. 5, the CPU 21 determines that there is a page for which it is determined, based on the browsing log, that the number of browses by the manager is larger than the number of browses by the driver and for which the difference between the number of browses by the driver and the number of browses by the manager is equal to or larger than the predetermined threshold value. The CPU 21 identifies that the page is the eco-friendliness degree page. Then, in step S11, the CPU 21 identifies the fourth switching part 80D, which is the tab for displaying the eco-friendliness degree page, as the specific tab. After that, in step S12, the CPU 21 changes the display form of the fourth switching part 80D from the display example shown in FIG. 6 to the display example shown in FIG. 8.

The page display part 81 shown in FIG. 8 has been changed from the page display part 81 shown in FIG. 6 in the contents of the displayed page. In the page display part 81 shown in FIG. 8, attention information 82 indicating that the manager is paying attention to the specific tab is displayed in addition to the evaluation value and the advice information regarding the steering operation of driver A. For example, in FIG. 8, "Manager is paying attention to 'eco-friendliness degree'" is displayed as the attention information 82.

In the above case, in step S12 in FIG. 5, the CPU 21 of the display control device 20 causes the display unit to display the attention information 82 in the steering operation page being displayed in the page display part 81. In this case, the attention information 82 is a change in the display form of the fourth switching part 80D that has been identified as the specific tab.

FIG. 9 is a diagram showing a first display example of the web application displayed on the display unit 26 of the display control device 20. When the web application is executed in the display control device 20 and a predetermined operation is performed on the web application, the CPU 21 of the display control device 20 causes the display unit 26 to display the display example shown in FIG. 9.

In the display example shown in FIG. 9, the page switching part 80 and the page display part 81 are displayed as in the display examples shown in FIG. 6 to FIG. 8.

In the display example shown in FIG. 9, the tab size of the first switching part 80A is largest in the page switching part 80, and the steering operation page corresponding to the first switching part 80A is displayed in the page display part 81.

In the page display part 81 shown in FIG. 9, unlike the display examples shown in FIG. 6 to FIG. 8, the evaluation values regarding the steering operation of a plurality of drivers managed by the manager and the advice information that contributes to an improvement in the evaluation value are displayed.

FIG. 10 is a diagram showing a second display example of the web application displayed on the display unit 26 of the display control device 20. The display example shown in FIG. 10 indicates the state in which the display form of the specific tab has been changed from the display form in the display example shown in FIG. 9.

For example, in step S11 shown in FIG. 5, the CPU 21 determines that there is a page for which it is determined, based on the browsing log, that the number of browses by the manager is larger than the number of browses by the driver and for which the difference between the number of browses by the driver and the number of browses by the manager is equal to or larger than the predetermined threshold value. The CPU 21 identifies that the page is the eco-friendliness degree page. Then, in step S11, the CPU 21 identifies the fourth switching part 80D, which is the tab for displaying the eco-friendliness degree page, as the specific tab. After that, in step S12, the CPU 21 changes the display form of the fourth switching part 80D from the display example shown in FIG. 9 to the display example shown in FIG. 10.

The page display part 81 shown in FIG. 10 has been changed from the page display part 81 shown in FIG. 9 in the contents of the displayed page. In the page display part 81 shown in FIG. 10, non-attention information 83 indicating that a plurality of drivers is not paying attention to the specific tab is displayed in addition to the evaluation values and the advice information regarding the steering operation of the drivers. For example, in FIG. 10, "Driver is not pay attention to 'eco-friendliness degree'" is displayed as the non-attention information 83.

In the above case, in step S12 in FIG. 5, the CPU 21 of the display control device 20 causes the display unit to display the non-attention information 83 in the steering operation page being displayed in the page display part 81. In this case, the non-attention information 83 is a change in the display form of the fourth switching part 80D that has been identified as the specific tab.

In this embodiment, the CPU 21 acquires the browsing log that includes the record indicating that the page of the web application corresponding to each tab was displayed on the display unit 26 and the display unit 46. In addition, the CPU 21 identifies a specific tab from among a plurality of tabs based on the difference between the number of browses by the driver and the number of browses by the manager that are recorded in the acquired browsing log. After that, the CPU 21 causes the display unit 26 and the display unit 46 to display the identified specific tab with the display form made different from the display form of the other tabs. As a result, this embodiment displays the tabs with the display form made different between a specific tab and the other tabs in this way, making it possible to encourage the driver to browse the information that the manager wants to emphasize.

In this embodiment, when changing the display form of the specific tab in step S12 in FIG. 5, the CPU 21 causes the display unit to display the specific tab with the display position of the specific tab changed on the display unit 26 and the display unit 46. As a result, this embodiment displays the specific tab with its display position changed in this way, making it possible for at least one of the driver and the manager to pay more attention to the specific tab.

In this embodiment, when changing the display form of the specific tab in step S12 in FIG. 5, the CPU 21 causes the display unit to display the specific tab with a decoration, different from that of the other tabs, applied to the specific tab on the display unit 26 and the display unit 46. As a result, this embodiment displays the specific tab with a decoration, different from that of the other tabs, applied to the specific tab in this way, making it possible for at least one of the driver and the manager to pay more attention to the specific tab.

In this embodiment, when changing the display form of the specific tab in step S12 in FIG. 5, the CPU 21 causes the display unit 46 to display the attention information 82. As a result, this embodiment makes it possible for the driver viewing the display unit 46 to recognize that the manager is paying attention to the specific tab.

In this embodiment, when changing the display form of the specific tab in step S12 in FIG. 5, the CPU 21 causes the display unit 26 to display the non-attention information 83. As a result, this embodiment makes it possible for the manager viewing the display unit 26 to recognize that the driver is not paying attention to the specific tab.

In this embodiment, the CPU 21 causes the display unit 46 to display the specific tab with the display form of the specific tab made different according to the attribute of the driver. The attribute of the driver includes, for example, the age of the driver, the number of years of work experience, etc. In this case, the specific tab may be displayed so that the display form of the specific tab becomes more prominent for an older driver. More specifically, the size of the displayed specific tab or the size of the characters in the specific tab may be set larger for a driver 60 years or older than for a driver younger than 60 years.

As a result, this embodiment makes it possible to adjust the driver's attention to the specific tab according to the attribute of the driver in this way.

Second Embodiment

Next, a second embodiment will be described. Note that the same description as that of the other embodiments will be omitted or simplified.

The identification unit 21B in the second embodiment identifies specific tabs by dividing them into two types, first specific tabs and second specific tabs, when identifying a plurality of specific tabs. The first specific tabs are each a specific tab that is identified when the difference between the number of browses by the driver and the number of browses by the manager is equal to or larger than a first threshold value and smaller than a second threshold value. The second specific tabs are each a specific tab that is identified when the difference is equal to or larger than the second threshold value. The first specific tab is an example of a "first specific element", and the second specific tab is an example of a "second specific element."

The display control unit 21C in the second embodiment causes the display unit to display the first specific tabs and the second specific tabs, both of which have been identified by the identification unit 21B, with the display form of the first specific tabs and the second specific tabs made different from the display form of the other tabs and made different between the first specific tabs and the second specific tabs.

For example, in the above case, the CPU 21 causes the display unit to display, in step S12 shown in FIG. 5, the first specific tabs and the second specific tabs with the color made different from the color of the other tabs and to display the first specific tabs and the second specific tabs with the color made different between them. As a result, when there is a plurality of specific tabs, this embodiment makes it possible to attract more attention to each of the specific tabs.

Third Embodiment

Next, a third embodiment will be described. Note that the same description as that of the other embodiments will be omitted or simplified.

As in the second embodiment, the identification unit 21B in the third embodiment identifies specific tabs by dividing them into two types, first specific tabs and second specific tabs, when identifying a plurality of specific tabs.

The display control unit 21C in the third embodiment causes the display unit to display the second specific tabs, identified by the identification unit 21B, with the display form of the second specific tabs made different from the display form of the other tabs and to display the first specific tabs with the display form of the first specific tabs made similar to the display form of the other tabs.

For example, in the above case, the CPU 21 causes the display unit to display, in step S12 shown in FIG. 5, the second specific tabs with the color made different from the color of the other tabs and to display the first specific tabs with the color made similar to the color of the other tabs. As a result, when there is a plurality of specific tabs, this embodiment makes it possible to attract more attention to the specific tab having the largest difference between the number of browses by the driver and the number of browses by the manager.

Others

In the above embodiment, the display control system 10 is a system that controls the display of a web application that can be browsed by both the driver and the manager. However, the display control system 10 is not limited to this system. The display control system 10 may be a system that controls the display of a native application and a website that can be browsed by both the driver and the manager.

In the above embodiment, the display unit 46 of the driver terminal 40 is used as an example of the "display unit of the driver". However, the "display unit of the driver" is not limited to this display unit. For example, in place of or in addition to the display unit 46, the monitor 77 of the vehicle 60 may be used as an example of the "display unit of the driver." In this case, the monitor 77 may be used to browse a web application, a native application, a website, etc.

In the above embodiment, a tab of the web application is used as an example of a "display element." However, the "display element" is not limited to this. For example, instead of or in addition to a tab, a link that is text or an image displayed on the web application and is used for displaying a predetermined page may be used as an example of the "display element." In this case, when the display form of a specific element is changed as shown in step S12 in FIG. 5, the display position of a specific link may be changed or a decoration different from the decoration of the other links may be used for the specific link.

In the above embodiment, a color different from the color of the other tabs is used for the decoration of the specific tab. However, the decoration method is not limited to this method. For example, in addition to coloring, the decoration method may be a change in the size of the specific tab, a change in the size of the characters indicated by the specific tab, or the display of a predetermined mark on the specific tab.

In the above embodiment, the attention information 82 is displayed on the web application displayed on the display unit 46 of the driver terminal 40. However, the method for notifying the driver of the attention information 82 is not limited to this method. For example, in addition to displaying on the web application, the attention information 82 may be sent by attaching it to an e-mail or the attention information 82 may be displayed on the display unit 46 as a popup using the web application notification function of the web application of the driver terminal 40.

In the above embodiment, the non-attention information 83 is displayed on the web application displayed on the display unit 26 of the display control device 20. However, the method for notifying the manager of the non-attention information 83 is not limited to this method. For example, in addition to displaying on the web application, the non-attention information 83 may be sent by attaching it to an e-mail or the non-attention information 83 may be displayed on the display unit 26 as a popup using the web application notification function of the display control device 20.

In the above embodiment, the tab sizes of the tabs other than the tab indicating the page being displayed in the page display part 81 are the same. However, the tab sizes of the other tabs need not be the same but may be different. For example, the sizes of the other tabs may get smaller as the tabs get closer to the right end of the page switching part 80.

In the above embodiment, the CPU 21 reads software (program) and performs the change processing. This change processing may also be performed by various processors other than the CPU. In this case, an example of the processor is (1) a programmable logic device (PLD) having a circuit configuration that can be changed after manufacturing such as a field-programmable gate array (FPGA) and (2) a dedicated electric circuit that is a processor having a circuit configuration designed exclusively for special purposes such as an application specific integrated circuit (ASIC). In addition, the change processing may be performed by one of these various processors or by a combination of two more processors of the same or different types (for example, two or more FPGAs, a combination of a CPU and an FPGA, etc.) The hardware structure of each of these various processors is, more specifically, an electric circuit in which circuit elements, such as semiconductor elements, are combined.

In the above embodiment, the display control program 24A is pre-stored (installed) in the storage unit 24. However, the program providing method is not limited to this method. Instead of being pre-stored in the storage unit 24, the display control program 24A may also be provided by recording it on a recording medium, such as a compact disk read only memory (CD-ROM), a digital versatile disk read only memory (DVD-ROM), and a universal serial bus (USB) memory, for distribution. The display control program 24A may also be downloaded from an external device via the network N.

What is claimed is:

1. A display control device comprising:
    an acquisition unit configured to acquire a browsing history, the browsing history including a record indicating that vehicle driving information corresponding to each of a plurality of display elements was displayed on a display unit of each of a driver of a vehicle and a manager who manages the driver;
    an identification unit configured to identify a specific element from among the plurality of the display elements based on a difference between the number of browses by the driver and the number of browses by the manager recorded in the browsing history acquired by the acquisition unit; and
    a display control unit configured to cause the display unit of at least one of the driver and the manager to display the specific element with a display form of the specific element made different from a display form of other display elements, the specific element being identified by the identification unit.

2. The display control device according to claim 1, wherein the display control unit is configured to cause the display unit to display the specific element with a display position of the specific element changed on the display unit of at least one of the driver and the manager.

3. The display control device according to claim 1, wherein the display control unit is configured to cause the display unit to display the specific element with a decoration applied to the specific element on the display unit of at least one of the driver and the manager, the decoration being different from a decoration of the other display elements.

4. The display control device according to claim 1, wherein the display control unit is configured to cause the display unit of the driver to display information indicating that the manager is paying attention to the specific element.

5. The display control device according to claim 1, wherein the display control unit is configured to cause the display unit of the manager to display information indicating that the driver is not paying attention to the specific element.

6. The display control device according to claim 1, wherein the display control unit is configured to cause the display unit of the driver to display the specific element with the display form of the specific element made different according to an attribute of the driver.

7. The display control device according to claim 1, wherein:
when a plurality of the specific elements is identified, the identification unit is configured to identify the specific elements by dividing the specific elements at least into first specific elements and second specific elements, the difference between the number of browses by the driver and the number of browses by the manager of each of the second specific elements being larger than the difference between the number of browses by the driver and the number of browses by the manager of each of the first specific elements; and
the display control unit is configured to cause the display unit to display the first specific elements and the second specific elements with a display form of the first specific elements and the second specific elements made different from the display form of the other display elements and made different between the first specific elements and the second specific elements, the first specific elements and the second specific elements being identified by the identification unit.

8. The display control device according to claim 1, wherein:
when a plurality of the specific elements is identified, the identification unit is configured to identify the specific elements by dividing the specific elements at least into first specific elements and second specific elements, the difference between the number of browses by the driver and the number of browses by the manager of each of the second specific elements being larger than the difference between the number of browses by the driver and the number of browses by the manager of each of the first specific elements; and
the display control unit is configured to cause the display unit to display the second specific elements with a display form of the second specific elements made different from the display form of the other display elements and to display the first specific elements with a display form of the first specific elements made similar to the display form of the other display elements, the first specific elements and the second specific elements being identified by the identification unit.

9. A display control method comprising:
acquiring a browsing history, the browsing history including a record indicating that vehicle driving information corresponding to each of a plurality of display elements was displayed on a display unit of each of a driver of a vehicle and a manager who manages the driver;
identifying a specific element from among the plurality of the display elements based on a difference between the number of browses by the driver and the number of browses by the manager recorded in the acquired browsing history; and
causing the display unit of at least one of the driver and the manager to display the identified specific element with a display form of the specific element made different from a display form of other display elements.

10. A display control program causing a computer to perform processing:
to acquire a browsing history, the browsing history including a record indicating that vehicle driving information corresponding to each of a plurality of display elements was displayed on a display unit of each of a driver of a vehicle and a manager who manages the driver;
to identify a specific element from among the plurality of the display elements based on a difference between the number of browses by the driver and the number of browses by the manager recorded in the acquired browsing history; and
to cause the display unit of at least one of the driver and the manager to display the identified specific element with a display form of the specific element made different from a display form of other display elements.

* * * * *